Sept. 10, 1946.  J. JANDASEK  2,407,496
FLUID TRANSMISSION
Filed June 28, 1943  2 Sheets-Sheet 1
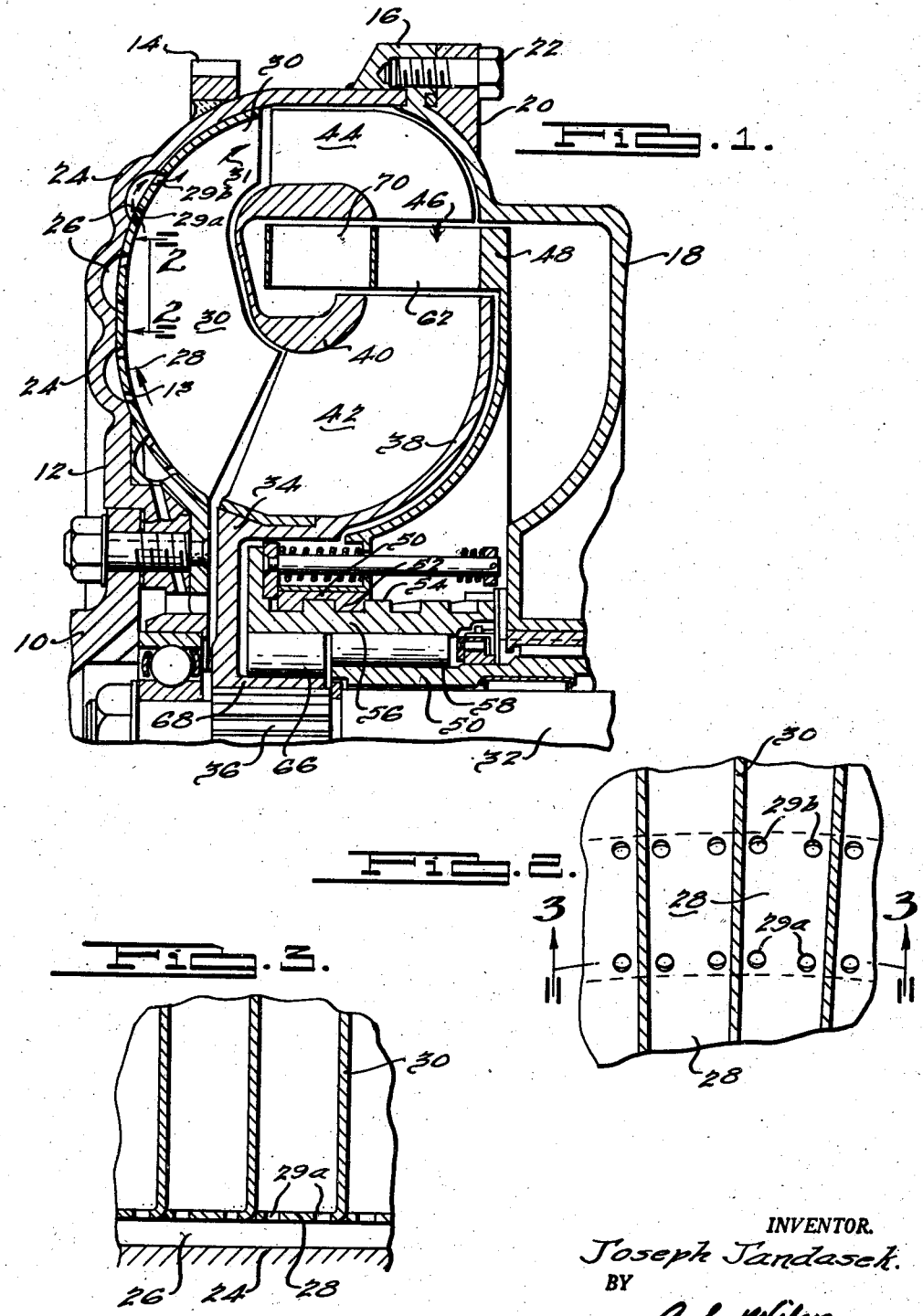
INVENTOR.
Joseph Jandasek.
BY Sept. 10, 1946.   J. JANDASEK   2,407,496
FLUID TRANSMISSION
Filed June 28, 1943     2 Sheets-Sheet 2
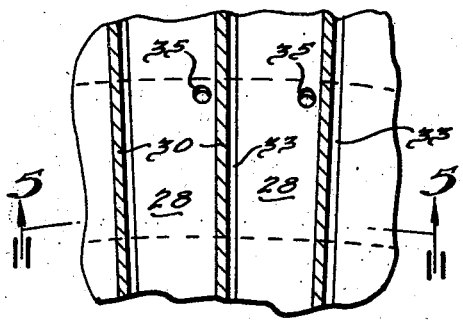
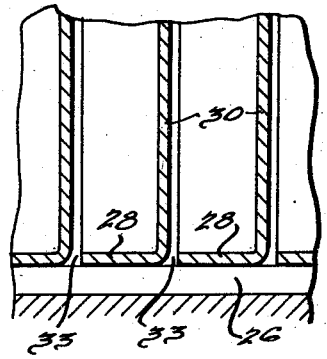
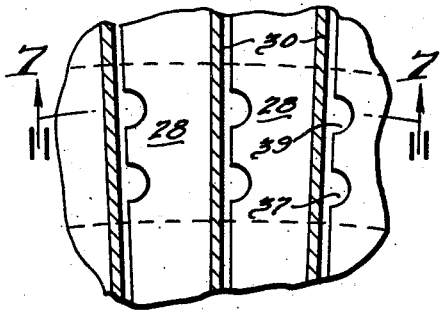
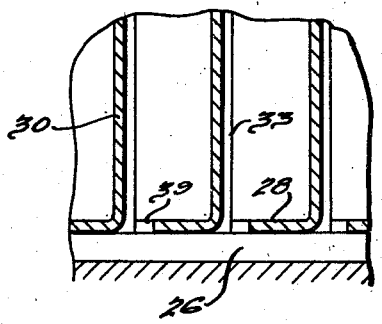
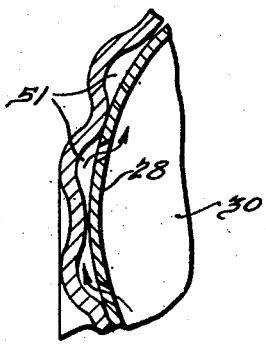
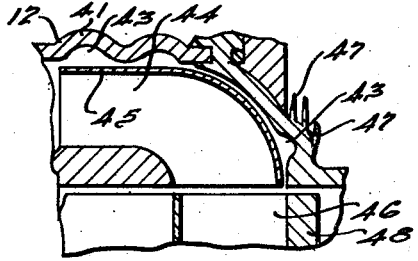
INVENTOR.
Joseph Jandasek.
BY Patented Sept. 10, 1946

2,407,496

UNITED STATES PATENT OFFICE 2,407,496

FLUID TRANSMISSION

Joseph Jandasek, Highland Park, Mich., assignor to Bendix Aviation Corporation, South Bend, Ind., a corporation of Delaware Application June 28, 1943, Serial No. 492,537

7 Claims. (Cl. 60—54)

This invention relates to transmissions and more particularly to fluid transmissions wherein circulation of the power transmitting fluid is effective to cool the fluid.

Heretofore in the fluid transmission art considerable difficulty has been encountered because of excessive heating of the power transmitting fluid. Radiators and other external cooling means have been provided in an effort to maintain the fluid at a desired temperature. These attempts have for a large part been unsatisfactory because of complications resulting from the positioning of the necessary cooling means, and the fact that considerable loss of efficiency results from directing the power transmitting fluid through the radiator or other cooling medium.

An object of this invention is therefore to provide a fluid transmission wherein circulation of the power transmitting fluid is effective to subject the fluid to cooling action under conditions whereby minimum loss of efficiency is encountered.

A further object of the invention resides in the provision of a fluid transmission having spaced cooling chambers so positioned that circulation of the power transmitting fluid induces it to flow through the cooling chambers.

Another object of the invention is to provide a fluid transmission having rotatable impeller or turbine members provided with external cooling chambers to receive a portion of the fluid as it circulates to subject the fluid to a cooling action.

Another object is to provide a fluid transmission having rotatable impeller or turbine members made of light weight corrugated members connected to fluid deflecting vanes to provide a light but strong fluid energizing or energy absorbing member wherein circulation of the power transmitting fluid induces a flow of fluid through the spaces provided by the corrugated members to subject the fluid to a cooling action.

Still a further object of the invention resides in the provision of cooling chambers for relatively movable members whereby circulation of the power transmitting fluid induces a flow of fluid through the cooling chambers.

Still a further object is to provide means associated with a fluid transmission housing whereby a portion of the power transmitting fluid may be progressively passed through a heat radiating chamber associated with the housing.

Still another object resides in the provision of a transmission housing having heat radiating projections adapted to receive spaced vanes positioned to lie adjacent the inner wall of the housing to substantially close the space between the heat radiating chamber and the interior of the housing to provide a cooling space between a smooth surface on the inside and a corrugated cooling surface on the outside.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a longitudinal sectional view of a fluid transmission embodying the present invention.

Fig. 2 is a sectional view taken substantially on the line 2—2 of Fig. 1 looking in the direction of the arrows.

Fig. 3 is a sectional view taken substantially on the line 3—3 of Fig. 2 looking in the direction of the arrows.

Fig. 4 is a view similar to Fig. 2 showing a modified form of the invention.

Fig. 5 is a sectional view taken substantially on the line 5—5 of Fig. 4 looking in the direction of the arrows.

Fig. 6 is a sectional view similar to Fig. 4 showing a still further modified form of the invention.

Fig. 7 is a sectional view taken substantially on the line 7—7 of Fig. 6 looking in the direction of the arrows.

Fig. 8 is a sectional view showing a still further modified form of cooling arrangement.

Fig. 9 is a fragmentary sectional view showing the application of the cooling feature to a turbine runner.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to Fig. 1, it will be observed that a driving shaft 10 has secured thereto a housing 12 having thereon a starter ring gear 14 and a flange 16. The flange 16 is adapted to receive a radially extended cover plate 18 having a flange 20 adapted to be detachably connected to the flange 16 by suitable bolts 22.

The radially extended portion of the housing 12 is provided with a plurality of preferably circumferentially extended corrugations 24 whereby liquid cooling chambers 26 may be formed between the corrugations 24 and radially extended flanges 28 carried by impeller blades 30 providing an impeller channel. A plurality of spaced apertures 29 in the flanges 28 may be provided to admit circulating liquid into the cooling chambers 26.

A driven shaft 32 coaxially aligned with the driving shaft 10 has thereon a turbine hub 34 secured against relative rotation by splines 36. The turbine hub 34 carries a turbine web 38 which supports a turbine shroud 40 through suitable second stage turbine vanes 42. The turbine shroud 40 is provided with first stage turbine vanes 44 aligned with the impeller channel defined by the impeller blades 30.

Interposed between the first stage turbine vanes 44 and the second stage turbine vanes 42 is an axially movable guide wheel member 46 carried by a guide wheel web 48 suitably mounted on a guide wheel hub 50 having internal helical threads 52 cooperating with external helical threads 54 carried by a sleeve 56.

One-way brake means 58 may be interposed between the sleeve 56 and a stationary member 60 to prevent backward rotation of the guide wheel 46 on the sleeve 56 when the device is operating as a torque converter at which time the channel 62 is positioned in the power transmitting fluid circuit between the first stage turbine 44 and the second stage turbine 42.

One-way driving means 66 interposed between the sleeve 56 and an axially extended flange 68 carried by the turbine hub 34 may be provided to prevent the guide wheel 46 from rotating freely in the forward direction in the power transmitting fluid circuit when the guide wheel 46 is shifted axially to position a channel 70 in the power transmitting fluid circuit between the first stage turbine 44 and the second stage turbine 42. In this position the circulating fluid impinges upon the vanes in channel 70 thereby transferring energy through the web 48, guide wheel hub 50, sleeve 56, one-way driving means 66, flange 68, to the driven shaft 32.

Referring now to Figs. 2 and 3 it will be observed that the flanges 28 of the impeller blades 30 are contoured as illustrated in Fig. 1 to provide the desired inner surface of the power transmitting fluid circuit. It will be noted that a plurality of spaced cooling chambers 26 are formed by the concentric corrugations 24 of the housing.

Each cooling chamber 26 is provided with spaced inlet and outlet openings 29—A and 29—B respectively whereby a portion of the power transmitting fluid flowing radially outwardly in the direction of the arrow 31 flows into successive cooling chambers 26 through the inlet openings 29—A and is again introduced into the power transmitting fluid circuit through the outlet openings 29—B.

In the operation of this device a portion of the fluid is constantly introduced into and expelled from the cooling chambers 26, and the cooled fluid is re-introduced into the fluid circuit to mix with the uncooled fluid and prevent the temperature of the power transmitting fluid from rising beyond a desired temperature. The external surface of the impeller housing being corrugated provides a large surface area in contact with the atmosphere whereupon rapid dissipation of heat may be effected.

It will be apparent that if desired, cooling fins may be applied to the corrugations 24 or to the surface of the impeller housing to increase the heat dissipating characteristics of the device. The cooling chambers 26 need not be concentrically formed, but may be of any desired configuration or shape.

The embodiment of the invention illustrated in Figs. 4 and 5 is similar in many respects to that illustrated in Figs. 1 to 3. It will be noted that the flanges 28 of the impeller vanes 30 are shortened to provide a space 33 between successive impeller vanes whereupon power transmitting fluid may readily flow into the cooling chambers 26. If desired auxiliary fluid outlet passages 35 through the flanges 28 may be provided to increase the outlet area above the inlet area to insure more rapid and positive dissipation of the power transmitting fluid from the cooling chambers under the influence of centrifugal force and suction exerted by the fluid flowing radially in the power transmitting fluid circuit over the flanges 28 of the impeller vanes.

The embodiment illustrated in Figs. 6 and 7 is generally similar to that discussed in connection with Figs. 4 and 5. It will be noted that auxiliary inlet and outlet passages 37 and 39 are provided to permit a more rapid introduction of the power transmitting fluid into the cooling chambers 26 and to expel it more rapidly therefrom.

In connection with the embodiments of Figs. 4 to 7 it will be noted that the flanges 28 of the impeller blades 30 need not accurately align with each other since a free space is provided between successively spaced blades. Greater manufacturing tolerances are thus insured whereupon the device may be manufactured more easily.

In the embodiment illustrated in Fig. 8 it will be noted that the housing 12 is provided with corrugations of varying degree whereby cooling chambers 37 extending over considerably greater radial length are provided to permit the fluid to flow a greater radial distance as it passes through the cooling chambers. These corrugations may take any desired form and any suitable inlet and outlet means may be provided to assure the desired flow of fluid through the cooling chambers in an efficient manner to provide the desired degree of cooling with minimum fluid turbulence.

Fig. 9 illustrates the application of the cooling feature to the first section turbine member 44. It will be noted that the housing 12 is provided with corrugations 41 to provide a cooling chamber 43 between a turbine shroud 45 and the casing 12 whereby a portion of the power transmitting fluid may flow through the corrugations 43 and be returned to the power transmitting fluid circuit at any desired point such for example as adjacent the guide wheel channel 46.

This type of construction may be employed in any location where a fluid energizing or energy absorbing member rotates at a different speed than a juxtaposed member. It will be apparent that cooling fins 47 may be provided to accelerate the dissipation of heat from the relatively movable members.

This is a continuation in part of my copending application, Serial No. 387,462, filed April 8, 1941, now Patent Number 2,363,731, issued November 28, 1944.

I claim:

1. In a fluid transmission, a corrugated housing, a power transmitting fluid circuit in the housing and fluid deflecting blades in the circuit having flanges defining in conjunction with the corrugated housing multiple cooling chambers communicating with the fluid circuit.

2. A fluid transmission comprising a corrugated housing, fluid deflecting blades carried thereby and defining therebetween cooling chambers.

3. In a fluid transmission, a housing, a power transmitting fluid circuit therein, a plurality of blades in the fluid circuit, said blades defining in conjunction with the housing multiple cooling chambers communicating with the power transmitting fluid circuit.

4. In a fluid transmission, a housing, a power transmitting fluid circuit in the housing, fluid energizing blades in the circuit having flanges defining in conjunction with the housing multiple fluid cooling chambers, the blade flanges being spaced apart to provide inter-communication between the cooling chambers and the fluid circuit.

5. In a fluid power transmitting device, a housing having a generally radially extending outer wall, spaced vanes positioned in the housing, and liquid cooling chambers interposed between the outer wall and the spaced vanes.

6. In a fluid transmission, a housing having concentrically arranged corrugations, a power transmitting fluid circuit including a plurality of liquid deflecting vanes providing relatively smooth internal surfaces, and liquid cooling chambers between said corrugations and internal surfaces having communication with the power transmitting fluid circuit between the vanes.

7. In a fluid transmission, a housing having concentrically disposed corrugations, spaced vanes positioned in the housing having flanges welded to the corrugations whereby liquid cooling chambers are formed between the corrugations and flanges.

JOSEPH JANDASEK.